(12) United States Patent
Jackson

(10) Patent No.: US 6,840,361 B1
(45) Date of Patent: Jan. 11, 2005

(54) TORQUE CONVERTER CLUTCH SOLENOID ASSEMBLY

(75) Inventor: Scott C. Jackson, Chester, VT (US)

(73) Assignee: Sonnax Industries, Inc., Bellows Falls, VT (US)

( * ) Notice: Subject to any disclaimer, the term of this patent is extended or adjusted under 35 U.S.C. 154(b) by 0 days.

(21) Appl. No.: 10/444,810

(22) Filed: May 22, 2003

Related U.S. Application Data

(60) Provisional application No. 60/381,719, filed on May 22, 2002.

(51) Int. Cl.$^7$ .......................... F16H 61/14; F16K 31/02
(52) U.S. Cl. ................. 192/3.3; 137/15.17; 251/129.15
(58) Field of Search ....................... 192/3.3; 137/15.17; 251/129.15, 129.02

(56) References Cited

U.S. PATENT DOCUMENTS

| | | | |
|---|---|---|---|
| 4,157,168 A | * | 6/1979 | Schlagmuller et al. . 251/129.02 |
| 5,465,937 A | | 11/1995 | Nokubo et al. ........ 251/129.15 |
| 5,707,039 A | * | 1/1998 | Hamilton et al. ...... 251/129.15 |
| 5,931,179 A | | 8/1999 | Megerle et al. ............... 137/15 |
| 6,019,203 A | * | 2/2000 | Patel et al. .................. 192/3.3 |
| 6,206,343 B1 | * | 3/2001 | Kato et al. ............. 251/129.15 |
| 6,276,663 B1 | * | 8/2001 | Anderson et al. ...... 251/129.02 |
| 6,543,472 B2 | | 4/2003 | Stafford ................... 137/454.2 |

OTHER PUBLICATIONS

"4L60 (700–R4) & 4L60–E", part nos. 77942–01K, Sonnax, p. 1, Jan. 14, 2002.*
"The Converter Clutch Learning Curve", Bob Warnke, Article No. TC–BW–599, four pages, May 1999.*

* cited by examiner

Primary Examiner—Rodney H. Bonck
(74) Attorney, Agent, or Firm—Clifford F. Rey

(57) ABSTRACT

A torque converter clutch solenoid assembly for controlling the converter clutch apply cycle of a General Motors 4L60-E transmission. The present solenoid assembly includes a solenoid snout having a longitudinal bore terminating in a fluid orifice wherein a one-way check valve has been installed to prevent transmission fluid backflow from the torque converter when not operating. The present check valve effectively replaces and performs the function of the original equipment converter clutch signal orifice check valve located in the converter clutch signal circuit, which actuates the torque converter clutch apply valve. The present solenoid assembly precludes the malfunction of the original equipment torque converter clutch apply valve resulting from physical displacement of the original equipment signal orifice check valve under fluid pressure. The present solenoid snout also resolves a stress crack problem inherent in the original molded plastic design by fabricating the solenoid snout from a durable aluminum material.

16 Claims, 6 Drawing Sheets

TORQUE CONVERTER CLUTCH SOLENOID ASSEMBLY

CROSS-REFERENCE TO RELATED APPLICATION

This application claims the benefit under 35 U.S.C. § 119(e) of U.S. Provisional Patent Application No. 60/381,719 filed May 22, 2002, entitled Torque Converter Clutch Solenoid Assembly.

BACKGROUND OF THE INVENTION

The present invention relates to automatic transmission systems and, more particularly, to improvements in a torque converter clutch (hereinafter "TCC") solenoid assembly for use in General Motors 4L60-E and other similar transmissions.

The General Motors 4L60-E (hereinafter "GM") transmission and other similar GM transmissions are equipped with mechanisms to "lockup" their torque converters to varying degrees under certain operating conditions. The purpose of the lockup converter is to provide for direct drive when the vehicle is cruising at higher speeds. Since there is always some slippage in the fluid coupling of a torque converter, some power is lost and fuel economy suffers. By providing a direct mechanical coupling through the transmission at high engine speeds, the lockup converter improves fuel economy.

This is accomplished by an electronic/hydraulic torque converter clutch system, which utilizes a lockup piston within the torque converter housing. The lockup piston has friction material on its forward surface. When the vehicle is at cruising speed and lockup is desired, an electric solenoid is energized, which opens the Torque Converter Clutch (hereinafter "TCC") Regulator Valve. This allows fluid pressure to act upon the lockup piston, which is forced against a machined surface on the converter cover. Thus, the lockup piston and the converter cover are locked together and act as a single unit similar to a manual transmission clutch. When lockup is no longer required, a port opens that allows the pressurized fluid to exhaust. The lockup piston then moves away from the torque converter housing re-establishing the fluid coupling.

In the GM 4L60-E transmission fluid pressure to the torque converter clutch is controlled by a pulse width modulated (hereinafter "PWM") solenoid (i.e. PWM TCC solenoid) that provides an output or control pressure in response to the duty cycle imposed on the solenoid coil. The PWM TCC solenoid sends automatic transmission fluid (hereinafter "ATF") to the TCC Regulator valve, which regulates it to a lesser pressure that is known as converter clutch (CC) signal pressure. Converter clutch signal pressure is not actually sent to the torque converter, but to the Converter Clutch Valve 200 (hereinafter "TCC Apply Valve") as shown in FIG. 1. The TCC Apply Valve 200 is actuated by a separate TCC solenoid 100. The Powertrain Control Module (hereinafter "PCM") (not shown) controls the TCC solenoid 100 (FIG. 1) to apply and release the torque converter clutch. The TCC solenoid 100 is a normally open, ON/OFF type solenoid that, when energized, initiates the converter clutch apply cycle.

A problem exists in the original equipment manufacture (hereinafter "OEM") TCC solenoid assembly 100 and, more particularly, in the solenoid snout 150, which conducts converter clutch signal fluid as at 145 (FIG. 1) to exhaust when the TCC solenoid 100 is in the OFF or release mode. The OEM solenoid snout 150 is fabricated from molded plastic material, which is subject to stress cracks that cause ATF leakage and improper functioning of the TCC apply valve 200.

In addition, an OEM TCC signal orifice check valve, indicated generally at 148, is installed in the converter clutch signal circuit 145 (FIG. 1) to control converter drain back when the vehicle is turned off. This miniature check valve 148 includes a plastic, capsule-type housing that is pressed into the converter clutch signal circuit 145 within the pump assembly 130. It is not uncommon for the OEM check valve 148 to be dislodged from its functional position and to be carried downstream under fluid pressure into the TCC apply valve 200 where it becomes jammed causing malfunction of the torque converter clutch.

Description of Related Prior Art Under 37CFR § 1.97

There are known prior art patents that are available in the field of hydraulic control valves and their discussion follows. One example of a fluid pressure control device is shown in U.S. Pat. No. 5,465,937 to Nokubo et al. This device discloses a solenoid valve combined with a changeover valve fixed within a housing. The solenoid valve includes a ball bearing-type valve closing body (FIG. 1) positioned in opening/closing relation to an internal fluid passage communicating with the solenoid valve.

U.S. Pat. No. 5,931,179 to Megerle et al. discloses a hydraulic control unit with a solenoid valve inserted into a receiving bore of a hydraulic block. The solenoid valve includes a hollow cylindrical valve housing, an armature disposed at one end face of the valve housing from which an armature rod fixed to the armature extends into the valve housing. A ball bearing is press-fitted into the free end of the armature as a valve closing body, which cooperates with a valve seat part.

Another example of a hydraulic control valve for an automatic transmission is shown in U.S. Pat. No. 6,543,472 to Stafford (also assigned to present assignee, Sonnax Industries, Inc.) which discloses a self-regulating pressure regulator valve having an internal check valve comprising a ball bearing-type check valve biased to a closed position by a compression spring. The internal check valve is encapsulated between a valve member and a detachable snout member (FIG. 1) and functions to divert hydraulic pressure in excess of 90 psi via an internal exhaust channel to the fluid sump to regulate hydraulic pressure from the throttle valve.

While these devices fulfill their respective, particular objectives and requirements, the aforementioned patents do not disclose the present Torque Converter Clutch Solenoid Assembly of the present invention, which substantially departs from the conventional concepts and designs of the prior art.

SUMMARY OF THE INVENTION

Accordingly, the present invention is a torque converter clutch solenoid assembly including a solenoid snout for use within the fluid pump of a GM 4L60-E or other similar automatic transmission wherein a one-way check valve has been installed to prevent backflow of transmission fluid from the torque converter via the solenoid snout when the vehicle is not operating. This check valve effectively replaces and performs the function of the OEM signal orifice check valve located in the converter clutch signal circuit within the fluid pump. The present modification to the OEM system is undertaken because the OEM signal orifice check valve often becomes dislodged from converter clutch signal circuit under fluid pressure and is physically displaced downstream jamming in the TCC apply valve. The present solenoid snout resolves this problem and also the stress-cracking problem inherent in the molded plastic construction of the OEM snout by fabricating the snout from a durable aluminum material.

Thus, there have been outlined rather broadly the important features of the invention in order that the detailed description thereof that follows may be better understood, and in order that the present contribution to the art may be better appreciated. There are additional features of the invention that will be described hereinafter and which will form the subject matter of the claims appended hereto.

Other features and technical advantages of the present invention will become apparent from a study of the following description and the accompanying drawings.

BRIEF DESCRIPTION OF THE DRAWINGS

The novel features of the present invention are set forth in the appended claims. The invention itself, however, as well as other features and advantages thereof will be best understood by reference to the following detailed description of an illustrative embodiment when read in conjunction with the accompanying figures, wherein:

DETAILED DESCRIPTION OF THE PREFERRED EMBODIMENTS

Prior to describing the present invention in detail it may be beneficial to review the structure and function of a torque converter clutch (TCC) solenoid assembly of the prior art. With reference to the drawings, there is shown diagrammatically a prior art TCC solenoid assembly, indicated generally at 100 and illustrated in FIG. 1. The TCC solenoid assembly 100 is shown installed in its functional position within the pump assembly 130 of the transmission.

Figure 1:
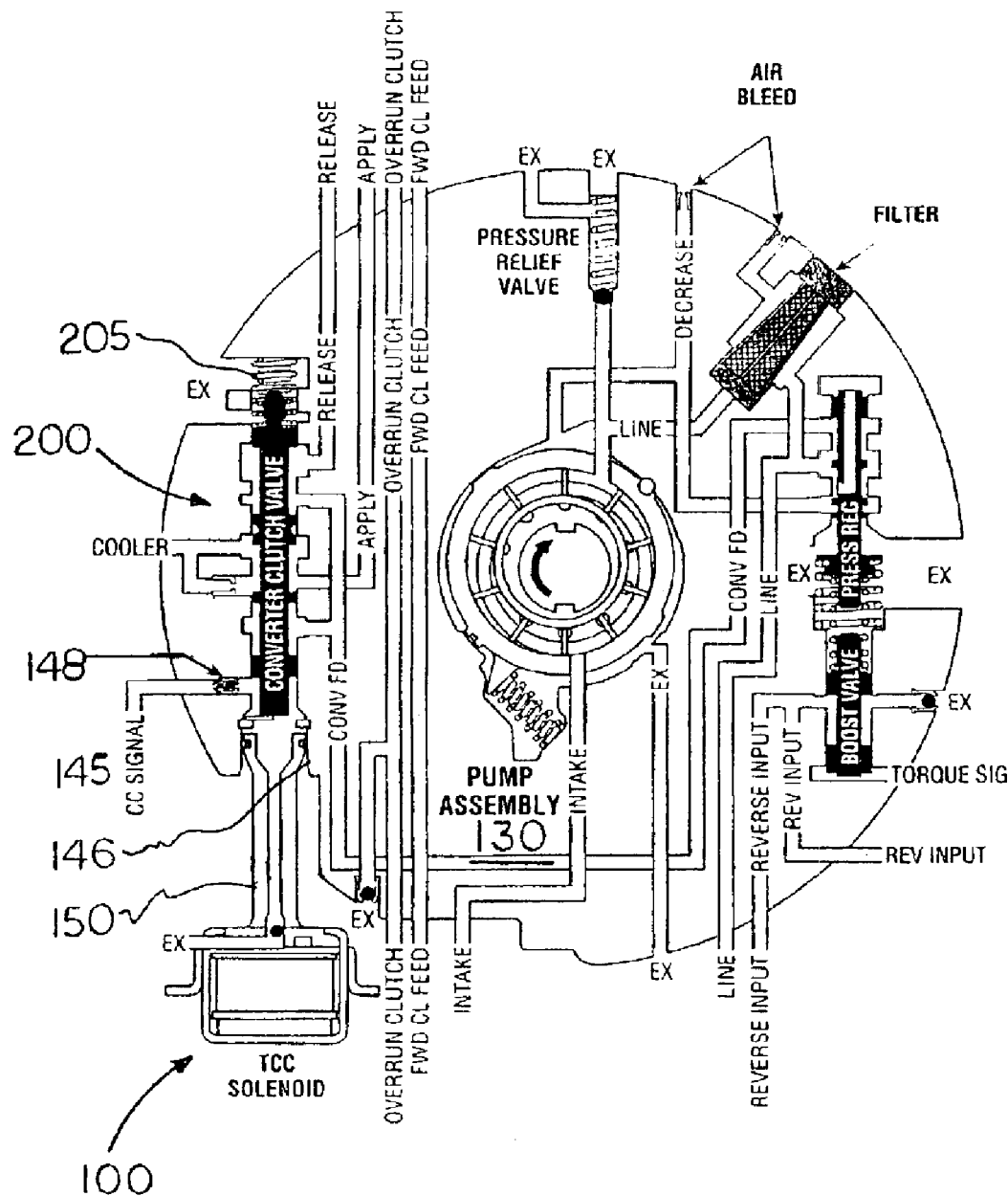
FIG. 1 is a diagrammatic view of the pump assembly of the prior art GM 4L60-E transmission showing the location of the TCC solenoid.
Figure 2:
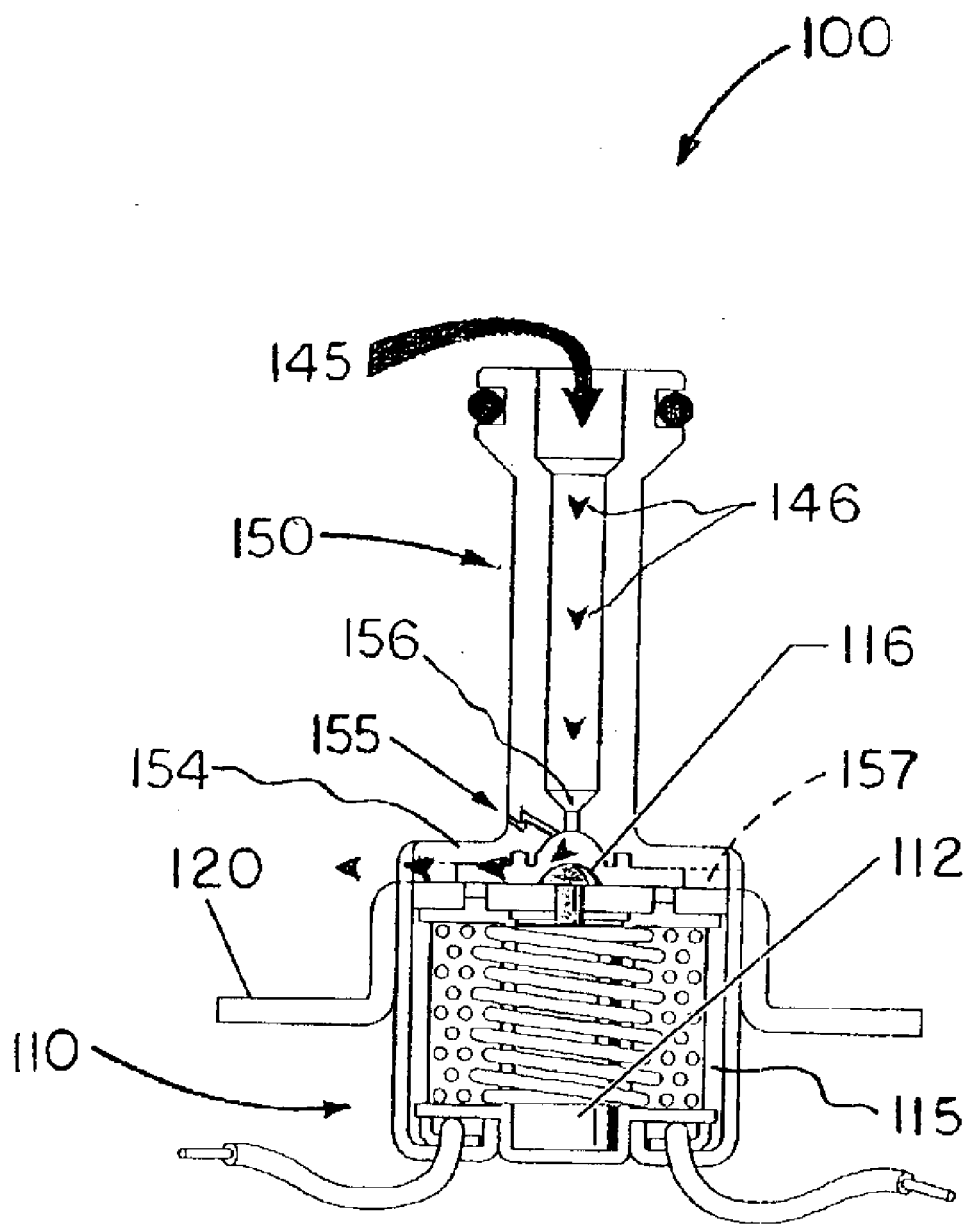
FIG. 2 is a longitudinal cross-section of the prior art TCC solenoid assembly illustrating the flow of converter clutch signal fluid through the solenoid assembly to exhaust.

Referring to FIG. 2 the prior art TCC solenoid assembly 100 is comprised of an electromagnetic solenoid, indicated generally at 110, a plunger 116, a mounting bracket 120, and a solenoid snout, indicated generally at 150. The TCC solenoid assembly 100 is a normally open, ON/OFF solenoid controlled by the Powertrain Control Module (PCM) (not shown) to apply and release the torque converter clutch (not shown). When de-energized, converter clutch signal fluid pressure as at 145 (FIG. 2) holds the plunger 116 away from the exhaust port 156. This permits converter clutch signal fluid 145 to exhaust through the solenoid snout 150 via port 156 and exhaust channels 157 formed in the base 154 of the snout as indicated by directional arrows 146 in FIG. 2. When converter clutch signal fluid 145 is diverted to exhaust, the TCC apply valve 200 is held in the release position by the force of spring 205 (FIG. 1).

When vehicle operating conditions are appropriate for TCC apply, the PCM provides a ground for the TCC solenoid 110 (FIG. 2). Electrical current flows through the solenoid coil 115, which creates a magnetic field. The magnetic field moves the plunger 116 to block the exhaust port 156 to prevent converter clutch signal fluid from exhausting through the solenoid. Thus, converter clutch signal fluid pressure increases at the TCC apply valve 200 and shifts the valve into the apply position against the force of spring 205.

A common problem with the OEM solenoid snout 150 is illustrated in FIG. 2. Due to the plastic construction of the OEM snout 150, repeated compression of the plunger 116 into contact with the exhaust port 156 eventually results in the formation of stress cracks as at 155 in proximity to the exhaust port and leakage of converter clutch signal fluid eventually occurs. Such fluid leakage has an adverse effect on the operation of the TCC apply valve 200 and the torque converter clutch.

Figure 3A:
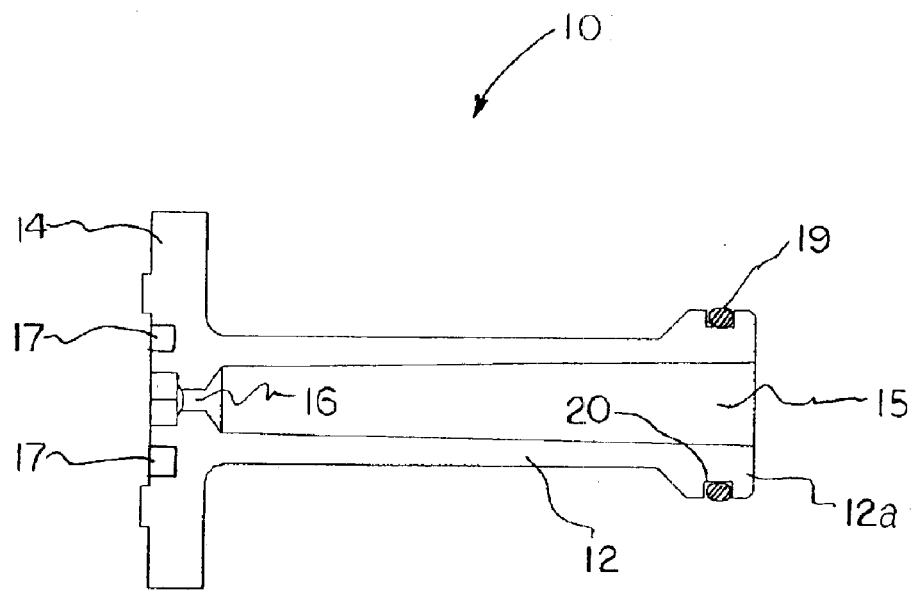
FIG. 3A is a longitudinal cross-section view of an embodiment of the solenoid snout of the present invention.
Figure 3B:
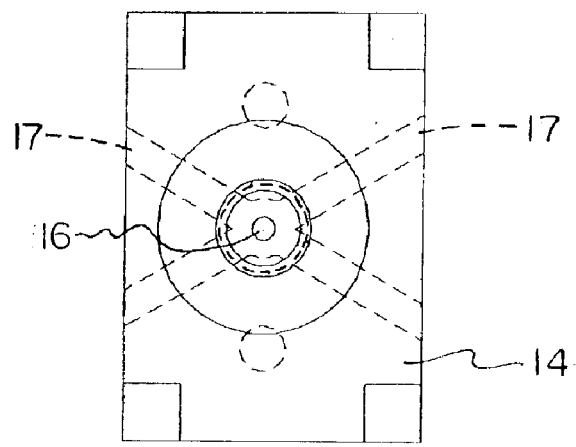
FIG. 3B is a right side elevation of the solenoid snout shown in FIG. 3A.

The present invention has been developed to resolve this problem and will now be described. Referring to FIGS. 3A-3B there is shown therein a solenoid snout in accordance with the present invention, indicated generally at 10. In one embodiment, among others, the present solenoid snout 10 is fabricated from cast aluminum or other suitable material to eliminate susceptibility to the stress cracks, which occur in the OEM snout 150. The solenoid snout 10 is comprised of a tubular member 12 integrally formed with a perpendicular base plate 14. Tubular member 12 includes a tapered, internal bore 15 formed in fluid communication with a plurality of exhaust channels 17 formed in base plate 14 via orifice 16.

The present solenoid snout 10 is also provided with structures comprising sealing means including, but not limited to, the following structures. The distal end 12a of tubular member 12 includes an annular groove 20 wherein an O-ring seal 19 or other suitable seal is disposed for sealing engagement within the mating bore 146 of the pump assembly 130 (FIG. 1).

Figure 4:
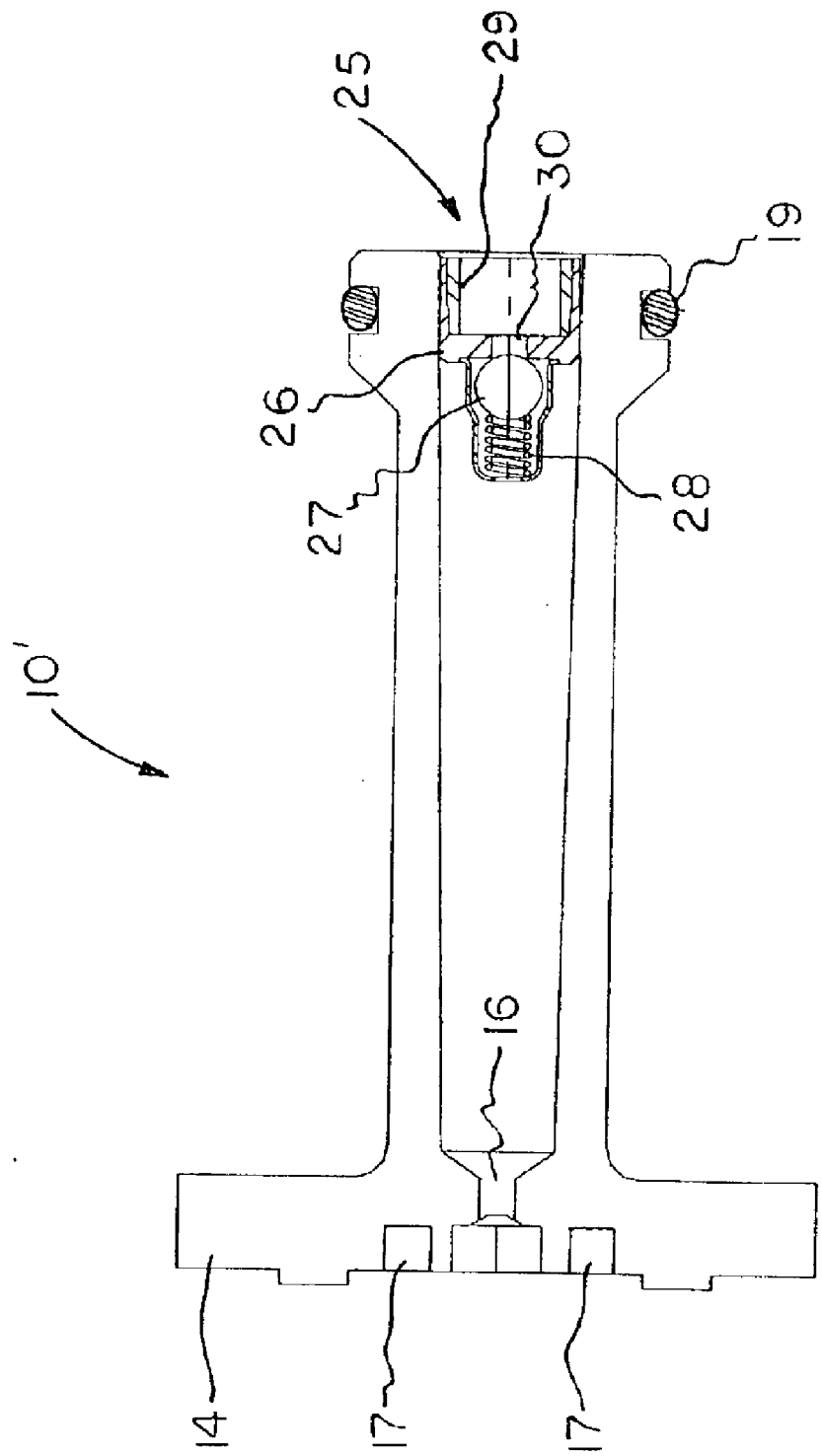
FIG. 4 is a longitudinal cross-section of another embodiment of the present solenoid snout including an internal check valve.

In another embodiment, the present solenoid snout 10' includes a unidirectional or one-way check valve, indicated generally at 25, which is installed within the tapered bore 15 of the snout as shown in FIG. 4. The one-way check valve 25 is comprised of a radially expandable housing 26 including an expansion sleeve 29 wherein a check ball 27 and compression spring 28 are disposed in opening/closing relation to orifice 30 to permit the flow of ATF in only one direction. The force of spring 28 is calibrated to allow converter clutch signal fluid at operating pressure to exhaust through the check valve 25 when the TCC solenoid is initially turned OFF.

During the TCC apply cycle when the solenoid is ON, the solenoid plunger 116 blocks the exhaust port 156 to prevent converter clutch signal fluid from exhausting through the solenoid snout 10'. Thus, converter clutch signal pressure increases at the TCC apply valve 200 and strokes the valve into the apply position against the force of spring 205 (FIG.

1) in normal operation. When the apply cycle is complete, the solenoid is turned OFF and the plunger 116 is released to permit the flow of converter clutch signal fluid at operating pressure to exhaust through the snout 10 via the check valve 25.

When the vehicle's engine is turned off, the force of spring 28 is sufficient to retain the check ball 27 in the closed position (FIG. 4) to prevent the backflow of ATF from the torque converter via the converter clutch signal circuit at 145 (FIG. 1). Thus, ATF is prevented from draining back through the solenoid snout 10', which would otherwise result in delayed transmission engagement at engine start up.

Figure 5:
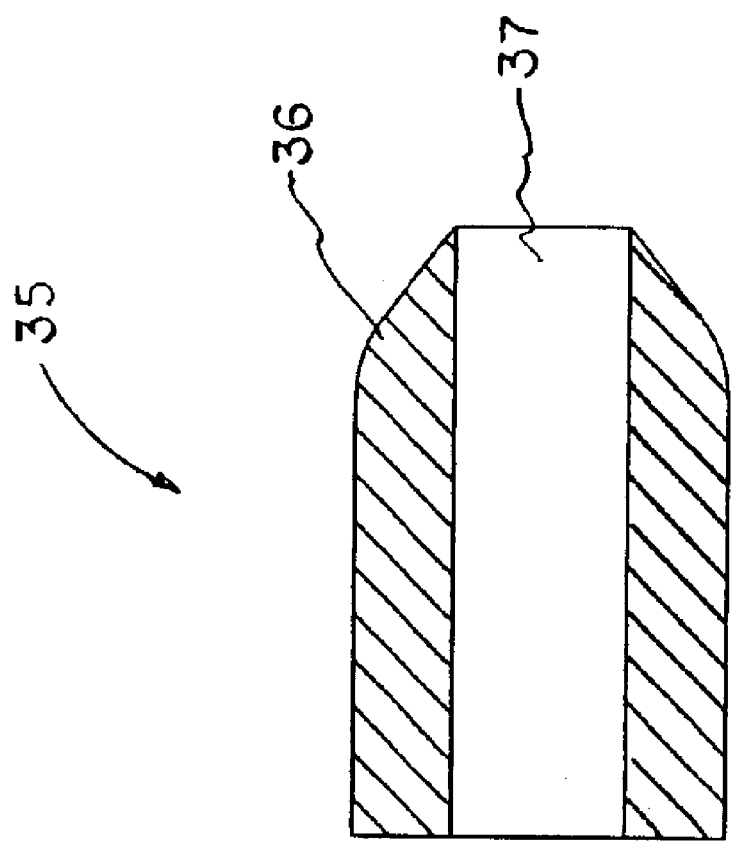
FIG. 5 is a longitudinal cross-section of a fluid orifice used in conjunction with the solenoid snout shown in FIG. 4.

In a method of the present invention, the one-way check valve 25 functions in lieu of the OEM miniature check valve 148 to prevent the backflow of ATF from the converter clutch signal circuit 145. This change to the OEM circuit is undertaken because the miniature check valve 148 often becomes dislodged from its functional position under fluid pressure and becomes jammed in the apply valve 200 causing malfunction of the torque converter clutch. In the present method the miniature check valve 148 is replaced by a calibrated plug orifice, indicated generally at 35, having a generally cylindrical body 36 with a calibrated bore 37 extending through it as shown in FIG. 5. Plug orifice 35 limits the flow of converter clutch signal pressure delivered to the apply valve 200 to a predetermined flow rate in operation.

Figure 6A:
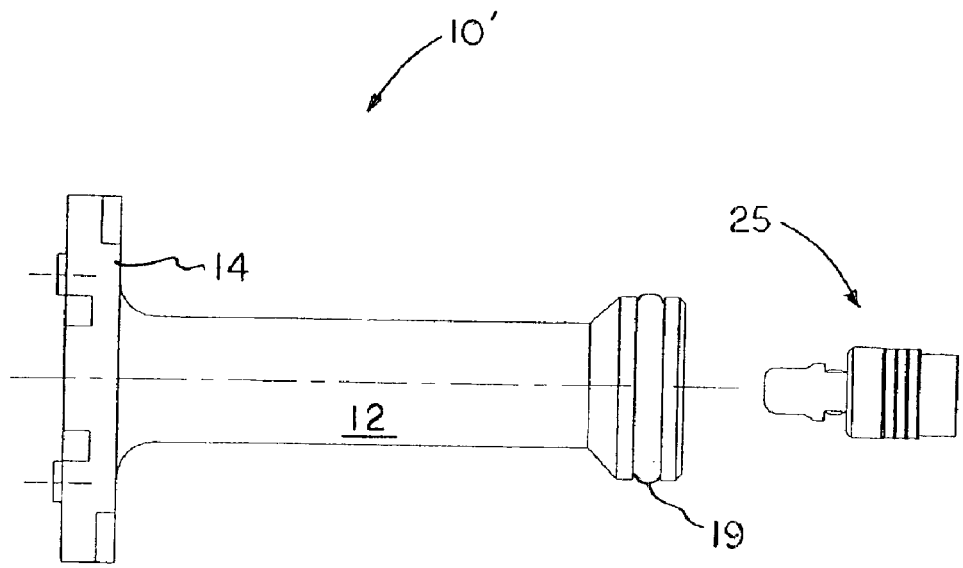
FIG. 6A is an exploded elevation view illustrating the components of the present solenoid assembly.
Figure 6B:
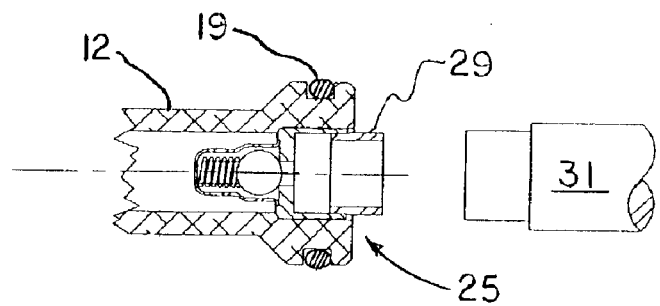
FIG. 6B is a partial longitudinal cross-section showing the internal check valve being installed within the snout.
Figure 6C:
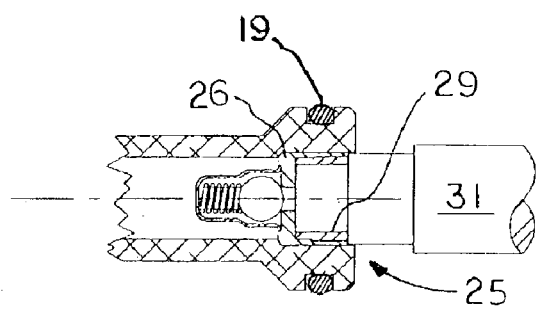
FIG. 6C is a partial longitudinal cross-section showing the internal check valve after installation is complete.

FIGS. 6A–6C illustrate the procedure for installing the check valve 25 into the present solenoid snout 10'. Initially, a check valve 25 of the appropriate size is provided and inserted into the distal end 12a of the solenoid snout. Next, the expansion sleeve 29 is driven into place with a tool such as an expansion pin or mandrel 31. The check valve housing 26 is forcibly expanded as the tool is pressed into sleeve 29 to provide an interference fit within the bore of the solenoid snout 10' as shown in FIG. 6C.

Although not specifically illustrated in the drawings, it should be understood that additional equipment and structural components will be provided as necessary and that all of the components described above are arranged and supported in an appropriate fashion to form a complete and operative torque converter clutch solenoid assembly incorporating features of the present invention.

Moreover, although illustrative embodiments of the invention have been described, a latitude of modification, change, and substitution is intended in the foregoing disclosure, and in certain instances some features of the invention will be employed without a corresponding use of other features. Accordingly, it is appropriate that the appended claims be construed broadly and in a manner consistent with the scope of invention.

What is claimed is:

1. A torque converter clutch solenoid assembly for use in combination with a torque converter clutch apply valve within a fluid pump of an automatic transmission for a land vehicle, said torque converter clutch solenoid assembly comprising:
    an electromagnetic solenoid having an extendable plunger, and
    a solenoid snout having a longitudinal bore terminating in a fluid orifice, said solenoid snout being mechanically coupled to said solenoid such that said plunger is disposed in opening/closing relation to said fluid orifice to control the flow of transmission fluid from a converter clutch signal circuit through said orifice to an exhaust passage, said solenoid snout including a one-way check valve to prevent the backflow of said automatic transmission fluid from said converter clutch signal circuit through said fluid orifice when said vehicle is not operating, wherein said one-way check valve is enclosed within a radially expandable housing installed in said snout member; and
    sealing means disposed about said solenoid snout to provide a leakproof seal within a mating bore in said fluid pump.

2. The torque converter clutch solenoid assembly of claim 1 wherein said one-way check valve includes a check ball that is spring-biased to a closed position within a fluid passage extending through said expandable housing.

3. The torque converter clutch solenoid assembly of claim 1 wherein said solenoid snout is fabricated from aluminum material.

4. The torque converter clutch solenoid assembly of claim 1 wherein said sealing means comprises an O-ring seal disposed about a distal end of said solenoid snout.

5. An improved torque converter clutch solenoid assembly including an electromagnetic solenoid having an extendable plunger for use in combination with a converter clutch apply valve within a fluid pump of an automatic transmission, wherein the improvement comprises:
    a solenoid snout having a longitudinal bore terminating in a fluid orifice, said solenoid snout being mechanically coupled to said solenoid such that said plunger is disposed in opening/closing relation to said fluid orifice to control the flow of transmission fluid from a converter clutch signal circuit through said orifice to an exhaust circuit, said solenoid snout including a unidirectional check valve to prevent the drain back of automatic transmission fluid from said converter clutch signal circuit through said fluid orifice when said transmission is not operating, wherein said check valve is enclosed within a radially expandable housing installed in said snout member.

6. The improved torque converter clutch solenoid assembly of claim 5 wherein said check valve includes a check ball that is spring-biased to a closed position within a fluid passage extending through said expandable housing.

7. The improved torque converter clutch solenoid assembly of claim 5 wherein said solenoid snout is fabricated from aluminum material.

8. In an automatic transmission having a torque converter clutch apply valve for actuating a torque converter clutch, said apply valve being controlled by an electronic solenoid including a solenoid snout having a longitudinal bore for delivering fluid output pressure to said apply valve, said apply valve being further controlled by converter clutch signal pressure delivered to said apply valve by a converter clutch signal circuit having a miniature check valve disposed therein, a method of preventing automatic transmission fluid backflow from said converter clutch signal circuit through said solenoid snout, said method comprising the steps of:
    providing a replacement solenoid snout constructed from a suitable material;
    removing said miniature check valve from said converter clutch signal circuit;
    replacing said miniature check valve with a calibrated plug orifice; and
    installing a one-way check valve enclosed within an expandable housing into said longitudinal bore of said solenoid snout to prevent said fluid backflow.

9. The method of claim 8 wherein the step of providing further includes the step of:

fabricating said replacement solenoid Snout from an aluminum material.

10. The method of claim 8 herein the step of installing further includes the steps of:

inserting said check valve including said expandable housing into said longitudinal bore; and expanding said housing to fit within said longitudinal bore.

11. The method of claim 10 wherein the step of expanding further includes the step of:

pressing an expansion sleeve into said housing in an axial direction to expand said housing in a radial direction to an interference fit within said bore.

12. The method of claim 11 wherein the step of pressing is carried out by an expansion mandrel.

13. A solenoid snout for use in combination with an electromagnetic solenoid in a fluid pump of an automatic transmission, said solenoid snout comprising:

a base plate including a plurality of exhaust channels formed therein;

a tubular body member having a longitudinal bore terminating in a fluid orifice, wherein said tubular body member is integrally formed in fluid communication with said base plate;

a one-way check valve enclosed within an expandable housing, wherein said expandable housing is disposed within said bore to prevent the backflow of transmission fluid through said bore to said exhaust channels when said transmission is not operating; and sealing means disposed about a distal end of said tubular body member to provide a leakproof seal within said fluid pump.

14. The solenoid snout of claim 13 wherein said one-way check valve includes a check ball that is spring-biased to a closed position within a fluid passage extending through said housing.

15. The solenoid snout of claim 13 wherein said solenoid snout is fabricated from aluminum material.

16. The solenoid snout of claim 13 wherein said sealing means comprises an O-ring seal radially disposed about a distal end of said tubular body member.

* * * * *